Jan. 24, 1956  C. R. WAGNER  2,732,376
PRODUCTION OF ALKENYLPYRIDINES
Original Filed Nov. 26, 1943
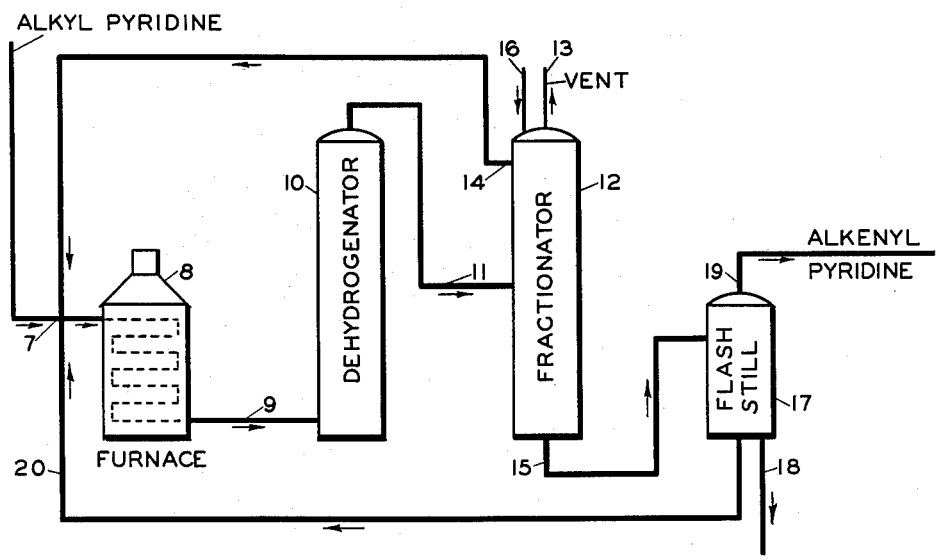
INVENTOR.
C. R. WAGNER
BY Hudson + Young
ATTORNEYS

United States Patent Office 2,732,376
Patented Jan. 24, 1956

2,732,376

PRODUCTION OF ALKENYLPYRIDINES

Cary R. Wagner, Utica, Ohio, assignor to Phillips Petroleum Company, a corporation of Delaware Original application November 26, 1943, Serial No. 511,892. Divided and this application August 9, 1948, Serial No. 43,237

9 Claims. (Cl. 260—290)

The present invention relates to the production of alkenylpyridines. In one specific embodiment it relates to the production of 2-vinylpyridine by dehydrogenation of 2-ethylpyridine to 2-vinylpyridine. The invention also pertains to a continuous process for the production of 2-vinylpyridine.

2-vinylpyridine or alpha-vinylpyridine, as well as 2-ethylpyridine or alpha-ethylpyridine, are known compounds. 2-vinylpyridine has been obtained in small amounts by passing pyridine and ethylene through a heated tube (Ladenburg, Berichte, 1887, vol. 20, page 1643). It has also been obtained from 2-(beta-hydroxyethyl)-pyridine by distillation of said compound alone and in the presence of alcoholic potassium hydroxide solution and by treatment of said compound with concentrated hydrochloric acid (Ladenburg, 1889, vol. 22, 2585; see also Loffler and Grosse, Berichte, 1907, vol. 40, page 1326) and by heating 2-(beta-hydroxyethyl)-pyridine with concentrated sulfuric acid at 160° to 170° C. (Ladenburg, Annalen, 1898, vol. 301, page 128). 2-vinylpyridine has been obtained together with beta-hydroxy-beta-(2-pyridyl)-propionic acid by heating a weak sodium hydroxide solution of beta-bromo-beta-(2-pyridyl)-propionic acid at 100° C. (Einhorn, Annalen, 1891, vol. 265, page 229). The compound is a liquid which is reported to have a boiling range of 79° to 82° C. at a pressure of 29 mm. of mercury, to boil at normal pressure with extensive resinification between 158° and 160° C., and to be volatile with steam. Homologues of 2-vinylpyridine which are known include 2-propenylpyridine (alpha-propenylpyridine), 4-propenylpyridine (gamma-propenylpyridine), 2-isopropenylpyridine (alpha-isopropenylpyridine), 2-butenylpyridine (2-crotylpyridine), and 5-ethyl-2-vinylpyridine.

2-ethylpyridine or alpha-ethylpyridine probably occurs in the lutidine fractions of oils resulting from the distillation of bones, bituminous shales and other nitrogenous materials. It has been found in the products resulting from heating N-ethylpyridinium iodide at 290° to 320° C.; other compounds which were also isolated from the product of such heating were 4-ethylpyridine and 2,4-diethylpyridine (Ladenburg, Berichte, 1883, vol. 16, page 2059; ibid., 1885, vol. 18, page 2962 and Annalen, 1888, vol. 247, page 14). 2-ethylpyridine was obtained together with 4-ethylpyridine by heating pyridine with ethyl iodide and absolute alcohol for ten hours at 310° to 320° C. (Ladenburg, Berichte, 1899, vol. 32, page 42). Small amounts of 2-ethylpyridine were obtained by passing a mixture of pyridine and ethyl alcohol over zinc dust at 270° to 280° C. (Dennstedt, Berichte, 1890, vol. 23, page 2570). It has also been prepared by heating 2-(beta-hydroxyethyl)-pyridine with an excess of hydroiodic acid (sp. gr. 1.7) and red phosphorous and thereafter treating the reaction mixture in an ice bath with zinc dust (Koenigs and Rappe, Berichte, 1902, vol. 35, page 1345). Other reactions in which 2-ethylpyridine has been found among the products are the dry distillation of a mixture of zinc dust and the hydrochloride of "norhydrotropidine" (1,4-iminocycloheptane, 2,6-ethylenepiperidine, 2,5-trimethylenepyrrolidine, also known as tropanine) (Ladenburg, Berichte, 1887, vol. 20, page 1651) and the dry distillation of ecgonine alkaloid with calcium carbonate and zinc dust (Stoehr, Berichte, 1889, vol. 22, page 1127). The conventional method of preparing 2-ethylpyridine (yield approximately 75% of the theoretical) consists of heating 2-(beta-hydroxyethyl)-pyridine with fuming hydrobromic acid and red phosphorous at 135° C., and, after filtering off the solids, treating the filtrate at 0° C. with zinc dust and concentrated hydrochloric acid (Loeffler and Grosse, Berichte, 1907, vol. 40, page 1327). 2-ethylpyridine is a liquid which is reported to have a boiling point of 148.7° C. at a pressure of 752 mm. of mercury. Isomers and higher homologues of 2-ethylpyridine which are known include 3-ethylpyridine (beta-ethylpyridine), 2 propyl-pyridine (alpha-propylpyridine, conyrine), 2-isopropylpyridine (alpha-isopropylpyridine), 4-isopropylpyridine (gamma-isopropylpyridine), 2-methyl-4-ethylpyridine, 2-methyl-5-ethylpyridine, 2-methyl-6-ethylpyridine, 4-methyl-3-ethylpyridine, 2-butylpyridine (alpha-butylpyridine), 4-tertiary-butyl-pyridine, 2,4-diethylpyridine and 3,4-diethylpyridine.

It is an object of the present invention to provide an improved process for the production of 2-vinylpyridine and its homologues and isomers.

A further object of the present invention is to provide a process for the production of alkenylpyridines.

A further object of the invention is to provide a process for the dehydrogenation of alkyl-substituted pyridines to alkenyl-substituted pyridines.

It is another object of the present invention to provide a continuous process for the production of alkenylpyridines which involves the dehydrogenation of the corresponding alkylpyridines.

Other objects and advantages of the invention, some of which are referred to specifically hereinafter, will be apparent to those skilled in art to which the invention pertains.

According to the present invention, alkenylpyridines are produced by dehydrogenation of the corresponding alkylpyridines. 2-vinylpyridine is produced, for example, by dehydrogenation of 2-ethylpyridine to form 2-vinylpyridine. The process is preferably conducted in a continuous manner as hereinafter more specifically described. The dehydrogenation may be catalytic, which is preferred, or simply a noncatalytic thermal dehydrogenation.

One specific embodiment of the present invention, which is a continuous process for the production of 2-vinylpyridine from 2-ethylpyridine, is represented diagrammatically on the accompanying drawing.

Ethylpyridine entering through conduit 7 is heated in furnace 8 to a suitable temperature for dehydrogenation and is then passed through conduit 9 to a dehydrogenator 10 which is charged with a suitable dehydrogenation catalyst. After being subjected to dehydrogenation, the product is passed through conduit 11 to a fractionator 12. In the event that noncatalytic dehydrogenation is to be used, dehydrogenator 10 is omitted and the desired thermal dehydrogenation is effected in furnace 8, which is a tube furnace, or other suitable pyrolysis apparatus, for example, a bath of lead or other molten metal, and the product is charged to fractionator 12.

Hydrogen and any low-boiling products which are formed in the dehydrogenation may be discharged from the fractionator through vent 13. In the fractionator a separation is made between 2-vinylpyridine, which is removed through a discharge outlet 15, and 2-ethylpyridine, which is the overhead and is returned to furnace 8 through conduit 14 for further dehydrogenation.

To prevent polymerization of 2-vinylpyridine during the distillation in fractionator 12, it is generally desirable to add an inhibitor such as sulfur to the material undergoing distillation. The inhibitor may be added at 16. If sulfur is used as inhibitor it will remain in the bottoms in fractionator 12 and will be discharged through conduit 15 with 2-vinylpyridine. For the purpose of removing the inhibitor in the 2-vinylpyridine in conduit 15 a flash still 17 may be provided. The inhibitor is discharged through outlet 18 from flash still 17 and the overhead vinylpyridine is recovered at outlet 19. Polymerized vinylpyridine and higher-boiling residual materials may be charged through line 20 to furnace 8 for further pyrolysis. The recovered inhibitor, if relatively free from contaminants, may be reused by charging it to inlet 16 at the top of fractionator 12.

The foregoing process is typical and by suitable substitution may be used for the production of alkenylpyridines generally from alkylpyridines.

Instead of starting with a monoalkyl pyridine, polysubstituted pyridines may be used. For example, 2-ethyl-4-methylpyridine may be dehydrogenated to give 2-vinyl-4-methylpyridine. If one starts with a pyridine substituted with two or more ethyl or higher alkyl groups a plurality of these groups may be dehydrogenated in the dehydrogenation step.

Sulfur has been disclosed herein as an inhibitor of the polymerization of vinylpyridine and other alkenylpyridines. It may be used both in the distillation as described herein, being introduced at the top of fractionator 12, and to inhibit the polymerization of the product on storage, in which event its removal by distillation before use may be required. However, other polymerization inhibitors, for example, alkyl-substituted catechols and similar suitable alkyl-substituted phenols, may be used instead of or in conjunction with sulfur. The amount of inhibitor to be used is largely dependent upon the effectiveness of the inhibitor and upon the degree of control of inhibition that is desired. Normally, in distillation, to inhibit polymerization, an amount of sulfur within the range of 0.1 to 1 per cent by weight of the material in the column is generally sufficient, although more may be used if desired.

Instead of using a continuous process as described, the various operations may be performed in batchwise manner. Thus the various products may be condensed and reheated without relation to their utilization in a continuous manner.

It is to be understood that the foregoing description is merely exemplary and that in actual operations, pumps, heat exchangers, and other suitable equipment which are not illustrated on the drawing will be required. Distillation under reduced pressure, for example, particularly for the separation in fractionator 12, is contemplated and is desirable because of the increased tendency for polymerization of the alkenylpyridine as the temperature is raised. Because the boiling points of alkylpyridines and the corresponding alkenylpyridines are so close to each other, generally not differing by more than approximately 10° C., fractionating columns of great size (60 plates or thereabouts) are required and the period of sojourn in said columns is rather long. Consequently, for this reason also, it is desirable to maintain as low a distillation temperature as possible.

The following table illustrates the closeness of the boiling points of some of the known alkylpyridines and corresponding alkenylpyridines:

Boiling ranges (° C.) of substituted pyridines

| | |
|---|---|
| 2-ethyl | 148.7/752 |
| 2-vinyl | 158–160 |
| 2-propyl | 166–168/758 |
| 2-propenyl | 189–190 |
| 2-isopropyl | 155–159 |
| 2-isopropenyl | 170–173 |
| 2-butyl | 189–192 |
| 2-butenyl | 190–210 |

The foregoing boiling point ranges are those reported in the literature and are the limits within which all the reported samples boiled, that is, they are not the boiling range of any particular sample; 2-vinylpyridine, for example, has been reported to boil between 158° and 159° C. and also between 159° and 160° C.

Catalysts suitable for the vapor-phase dehydrogenation of alkylpyridines to alkenylpyridines include chromium oxide and molybdenum oxide, which may be used alone or supported on suitable catalyst carriers. A preferred catalyst is unglowed chromium oxide supported on alumina or bauxite. Other suitable catalysts include thorium oxide on alumina. An especially advantageous catalyst is one containing chromium oxide together with calcium oxide or other alkaline-earth-metal oxide and/or an alkali-metal oxide or hydroxide, or one such as is described in Corson and Cox Patent No. 2,311,979. Other suitable chromium oxide catalysts are described in the patents of Morey and Frey (No. 2,270,887), Matuszak (No. 2,294,414), Grosse (No. 2,172,534), Huppke and Frey (No. 1,905,383, and 2,098,959), and Visser and Engel (No. 2,249,337).

The dehydrogenation is preferably conducted under reduced pressure. This may be accomplished by diluting the reactants with an inert gas such as nitrogen, steam, or carbon monoxide.

The temperatures which are used for the dehydrogenation are generally within the range of approximately 800° to approximately 1200° F. and preferably between 900° and 1100° F. As previously stated, low dehydrogenation temperatures may be used when catalysts are employed to facilitate the reaction.

As an example of the practice of the process of this invention, the following preparation of 2-vinylpyridine, which is a batchwise operation, is cited: Ethylpyridine is heated to a temperature of approximately 1000° F. by passing it through a tube and is then passed through a tube containing a chromium oxide catalyst supported on bauxite. The vapors are condensed and distilled fractionally in a 6-foot glass column packed with glass helixes to separate the undehydrogenated 2-ethylpyridine from the 2-vinylpyridine. Substantial yields of 2-vinylpyridine are obtained, although the conditions specified in the foregoing example are not to be understood to be optimum conditions.

2-vinylpyridine and other alkenylpyridines which can be obtained by the process of the present invention may be readily polymerized to products which are useful as plastics and which can be molded under heat and pressure and which are thermoplastic as contrasted to thermosetting plastic materials. They are also useful in the form of copolymers with 1,3-butadiene, isoprene (2-methyl-1,3-butadiene) and piperylene (1,3-pentadiene), respectively, as "synthetic rubbers" namely, products which possess a high elasticity and resemble natural rubber in other respects. Such copolymers even surpass natural rubber in some properties.

This application is a division of my copending application Serial No. 511,892 filed November 26, 1943, now abandoned.

I claim:

1. A process for the production of 2-vinylpyridine which comprises dehydrogenation of 2-ethylpyridine in the presence of a solid dehydrogenation catalyst at a temperature within the range of approximately 800° to approximately 1200° F. to produce 2-vinylpyridine.

2. A process as defined in claim 1 in which the dehydrogenation catalyst is a catalyst containing chromium oxide.

3. A continuous process for the production of 2-vinylpyridine which comprises subjecting 2-ethylpyridine to dehydrogenation in the presence of a dehydrogenation catalyst at a temperature within the range of approximately 800° to approximately 1200° F., separating undehydrogenated ethylpyridine from the product of the dehydrogenation reaction and recharging it to the dehydrogenation catalyst, and separating by fractional distillation in the presence of an inhibitor of polymerization and recovering 2-vinylpyridine from the product of the dehydrogenation reaction.

4. A process for the preparation of vinylpyridine which comprises dehydrogenation of ethylpyridine at a temperature within the range of 800 to 1200° F. in the presence of a catalyst containing chromium oxide.

5. A process for the preparation of vinylpyridine which comprises dehydrogenation of ethylpyridine at a temperature within the range of 800 to 1200° F. in the presence of a catalyst containing chromium oxide, separating undehydrogenated ethylpyridine from the product of the dehydrogenation reaction and recharging it to the catalyst, and separating by fractional distillation in the presence of an alkyl-substituted phenol as an inhibitor of polymerization and recovering vinylpyridine from the product of the dehydrogenation reaction.

6. A process of producing a vinyl pyridine which comprises passing the vapors of an ethyl pyridine over a solid dehydrogenation catalyst at a temperature within the range of approximately 500° C. to approximately 650° C. to produce a vinyl pyridine and recovering the thus produced vinyl pyridine.

7. A dehydrogenation process which comprises passing the vapors of an alkylpyridine with no alkyl group having in excess of five carbon atoms, said alkylpyridine being selected from the group consisting of 2-ethylpyridine, 2-propylpyridine, 4-ethylpyridine, 2-isopopylpyridine, 2-butylpyridine, 3-ethylpyridine, 4-isopropylpyridine, 2-methyl-4-ethylpyridine, 2-methyl-5-ethylpyridine, 2-methyl-6-ethylpyridine, and 4-methyl-3-ethylpyridine, over a solid dehydrogenation catalyst at a temperature within the range of approximately 800° F. to approximately 1200° F., to produce the corresponding alkenylpyridine, and recovering said corresponding alkenylpyridine.

8. The process of claim 7 wherein said alkylpyridine is 4-ethylpyridine.

9. The process of claim 7 wherein said alkylpyridine is 2-methyl-5-ethylpyridine.

References Cited in the file of this patent

UNITED STATES PATENTS

| | | |
|---|---|---|
| 2,141,611 | Malishev | Dec. 27, 1938 |
| 2,259,723 | Ballard | Oct. 21, 1941 |
| 2,300,971 | Roberts | Nov. 3, 1942 |
| 2,376,532 | Egloff | May 22, 1945 |

FOREIGN PATENTS

| | | |
|---|---|---|
| 115,967 | Australia | 1942 |
| 836,697 | France | 1938 |

OTHER REFERENCES

Berichte 20 (1887), p. 1643.

Sidgwick: "Org. Chem. of Nitrogen" (1942), pp. 516, 517.

Degering: "Outline of Org. Nitrogen Compound," 628 and 629.